(12) United States Patent
Mann et al.

(10) Patent No.: US 8,981,894 B2
(45) Date of Patent: Mar. 17, 2015

(54) ANTENNA DEVICE, PARTICULARLY FOR A MOBILE RADIO SYSTEM, HAVING A PLURALITY OF ASSOCIATED FUNCTIONAL UNITS

(75) Inventors: Burkhard Mann, Kolbermoor (DE); Johann Schmid, Riedering (DE)

(73) Assignee: Kathrein-Werke KG, Rosenheim (DE)

( * ) Notice: Subject to any disclaimer, the term of this patent is extended or adjusted under 35 U.S.C. 154(b) by 379 days.

(21) Appl. No.: 13/321,041

(22) PCT Filed: May 19, 2010

(86) PCT No.: PCT/EP2010/003071
§ 371 (c)(1),
(2), (4) Date: Nov. 17, 2011

(87) PCT Pub. No.: WO2010/133352
PCT Pub. Date: Nov. 25, 2010

(65) Prior Publication Data
US 2012/0062356 A1   Mar. 15, 2012

(30) Foreign Application Priority Data
May 20, 2009   (DE) .......................... 10 2009 022 158

(51) Int. Cl.
*G05B 23/02*   (2006.01)
*H01Q 21/08*   (2006.01)
*H01Q 23/00*   (2006.01)
(Continued)

(52) U.S. Cl.
CPC .............. *H01Q 21/08* (2013.01); *H01Q 23/00* (2013.01); *H04W 24/02* (2013.01)
USPC .............................. 340/3.6; 343/907; 343/787

(58) Field of Classification Search
USPC ............ 340/3.5, 9.1, 9.11–9.17, 9.2, 9.7, 3.6; 711/200–221; 700/23; 343/907, 787
See application file for complete search history.

(56) References Cited

U.S. PATENT DOCUMENTS

| 6,359,871 B1 * | 3/2002 | Chung et al. .................. 370/338 |
| 6,609,225 B1 * | 8/2003 | Ng ................................ 714/781 |
| 6,711,494 B2 * | 3/2004 | Peel et al. ..................... 711/201 |

(Continued)

FOREIGN PATENT DOCUMENTS

| CN | 101283522 A | 10/2008 |
| DE | 601 25 382 T2 | 9/2007 |
| WO | WO 03/079484 | 9/2003 |

OTHER PUBLICATIONS

International Search Report for PCT/EP2010/003071 mailed Sep. 14, 2010.

(Continued)

*Primary Examiner* — Jennifer Mehmood
*Assistant Examiner* — Omar Casillashernandez
(74) *Attorney, Agent, or Firm* — Nixon & Vanderhye P.C.

(57) ABSTRACT

The invention relates to an improved antenna device, characterized by the following additional features:—that each functional unit (21) can communicate bidirectionally with the remote control unit (RC) by means of the communication bus (23),—the configuration, the controller, and/or the querying of one or more functional units (21) of the at least one emitter device takes place over the entire communications bus (23),—the communication to the remote control unit (RC) is handled by each addressed functional unit (21), and—an internal communications bus (25) is provided for exchanging information and/or action states between the functional units (21) connected in the at least one emitter device.

23 Claims, 6 Drawing Sheets

(51) Int. Cl.
 *H01Q 1/00* (2006.01)
 *H04W 24/02* (2009.01)

(56) References Cited

U.S. PATENT DOCUMENTS

| | | | |
|---|---|---|---|
| 7,173,570 B1 * | 2/2007 | Wensink et al. | 343/760 |
| 7,602,746 B2 * | 10/2009 | Calhoun et al. | 370/328 |
| 2004/0004943 A1 | 1/2004 | Kim et al. | |
| 2004/0152492 A1 * | 8/2004 | Gray | 455/562.1 |
| 2006/0229048 A1 * | 10/2006 | Carroll et al. | 455/268 |
| 2007/0161348 A1 * | 7/2007 | Gribben et al. | 455/13.3 |
| 2007/0180236 A1 * | 8/2007 | Kuroyanagi et al. | 713/162 |
| 2008/0291116 A1 * | 11/2008 | Le et al. | 343/907 |
| 2009/0040106 A1 | 2/2009 | Le et al. | |
| 2009/0254689 A1 * | 10/2009 | Karamcheti et al. | 710/301 |

OTHER PUBLICATIONS

Written Opinion of the International Searching Authority mailed Sep. 14, 2010.

* cited by examiner

ANTENNA DEVICE, PARTICULARLY FOR A MOBILE RADIO SYSTEM, HAVING A PLURALITY OF ASSOCIATED FUNCTIONAL UNITS

This application is the U.S. national phase of International Application No. PCT/EP2010/003071 filed 19 May 2010 which designated the U.S. and claims priority to DE 10 2009 022 158.1 filed 20 May 2009, the entire contents of each of which are hereby incorporated by reference.

The invention relates to an antenna device, in particular for a mobile radio system, having a plurality of associated functional units according to the preamble of claim 1.

Mobile radio antennae are being increasingly fitted with remote-controllable or remote-queryable functions. In the past, this was carried out using equipment or functional groups which can optionally be mounted externally. Known uses of this type are the control of the down-tilt of an antenna, also called remote electrical tilt (RET), or the monitoring and control of a tower mounted amplifier (TMA), etc.

More recent functions are the detection of antenna parameters such as azimuth alignment, mechanical inclination, control of the beam width, acquisition of thermal data, of mechanical changes in position and the acquisition of the geodata of the antenna.

Each of these functions is realised by a separate functional unit or by a combination of functional units. Depending on the antenna configuration, these functional units are partly or completely also integrated into the antenna. This provides opportunities for combining similar demands made on the functional units in respect of communication, data management and range of functions.

US 2008/0291116 A1 and US 2009/0040106 A1 disclose solutions for the control of a plurality of functional units in one device or antenna which each comprise a first or so-called master controller which control so-called sub-controllers or slaves in the antenna units. In this respect, the master is provided with an appropriate interface, via which there is a cable-bound connection to the external remote control unit. The master which is outwardly visible, i.e. to the remote control unit (remote controller) handles the communication with the respective slave functional units which are accommodated in the antenna device or are connected in the antenna device. The master can forward the respective commands to the respective slave function via a communications bus inside the antenna device. The response signals received by a slave function, i.e. by a functional unit accommodated inside an antenna or close to an antenna are returned by the master controller to the controller on the side of the base station which is also called an external remote control unit. Since only the master is outwardly visible to the external remote control unit, the master can be addressed by a single addressing procedure. The master can manage the individual functional units (slaves) connected thereto via subaddresses.

It is evident from the description that the external remote control unit (base station controller) always communicates with the slave units (functional units inside or close to the antenna) via the master controller.

Finally, reference is also made to DE 601 25 382 T2 which also describes a cellular antenna.

DE 601 25 382 T2 provides diverse embodiments in which a plurality of antennae can be arranged at a distance from one another. Each of these antenna devices comprises a respective adjustment means which actuates a respective actuator in the antenna concerned.

The actuator can be actuated upon activation of the respective adjustment means in different ways.

In one embodiment, a separate HF feeder cable runs between a base station and the respective antenna, by which the control data for each antenna device can also be transmitted.

In another embodiment, a control data receiving device is provided in one of the three HF feeder cables, which device receives the control data for all antenna devices via a single HF feeder cable, branches off from the HF feeder cable and feeds into a separate serial line. This serial line leads to a first control data receiving device in the first antenna device, the serial line, under the effect of a series connection, then conducting a connection in the second control data receiving device provided in the second antenna device and from there to the third control data receiving device of the third antenna unit.

In a further modified embodiment, the control data is not transmitted via an HF feeder, but via a separate line which leads to a first control data receiving device and from there, again in the sense of a series connection, to a respective next control data receiving device which is accommodated in the next antenna device.

In contrast, the object of the present invention is to provide an improved antenna device, i.e. an antenna with integrated and/or associated or connected internal functional units which can be actuated by an antenna-remote, external functional unit.

According to the invention, the object is achieved in accordance with the features stated in claim 1. Advantageous configurations of the invention are provided in the subclaims.

The invention is based on the fact that a connection is established between the external remote control unit (remote controller) and the functional units close to the antenna or integrated into the antenna, via a direct communications bus, for example via an interface (for example an RS-485 interface) or via a modem.

The invention has a number of advantages over the prior art.

Thus, in the context of the invention, the initialisation procedure can be simplified in that the allocation of the addresses required for communication is optimised. With a single addressing procedure, the allocation of the so-called base address, all the functional units are addressed and are then addressed via individual subaddresses which, in a firmly predetermined manner, are used for the differentiation and addressing of the functional units inside the antenna device, while considering a possible offset (which will be described in more detail later on). This is also possible for chain-connected antenna devices.

A further advantage of the invention is that a solution is indicated in which every functional unit can be addressed directly and with equal access by the remote control unit. The remote control unit can directly access the individual functional units via a standardised communications interface. A so-called parallel processing then results, avoiding access only via the master which then proves to be a bottleneck.

With the objective of being able to expand the communications structure by further chain-connected individual functional units or antenna devices and with the possibility of inter-communication, directly or via an interface module, the possibility is provided of saving costs through the multiple use of functional units.

In the following, the invention will be described in more detail on the basis of embodiments with reference to the drawings, in which.

Figure 8:
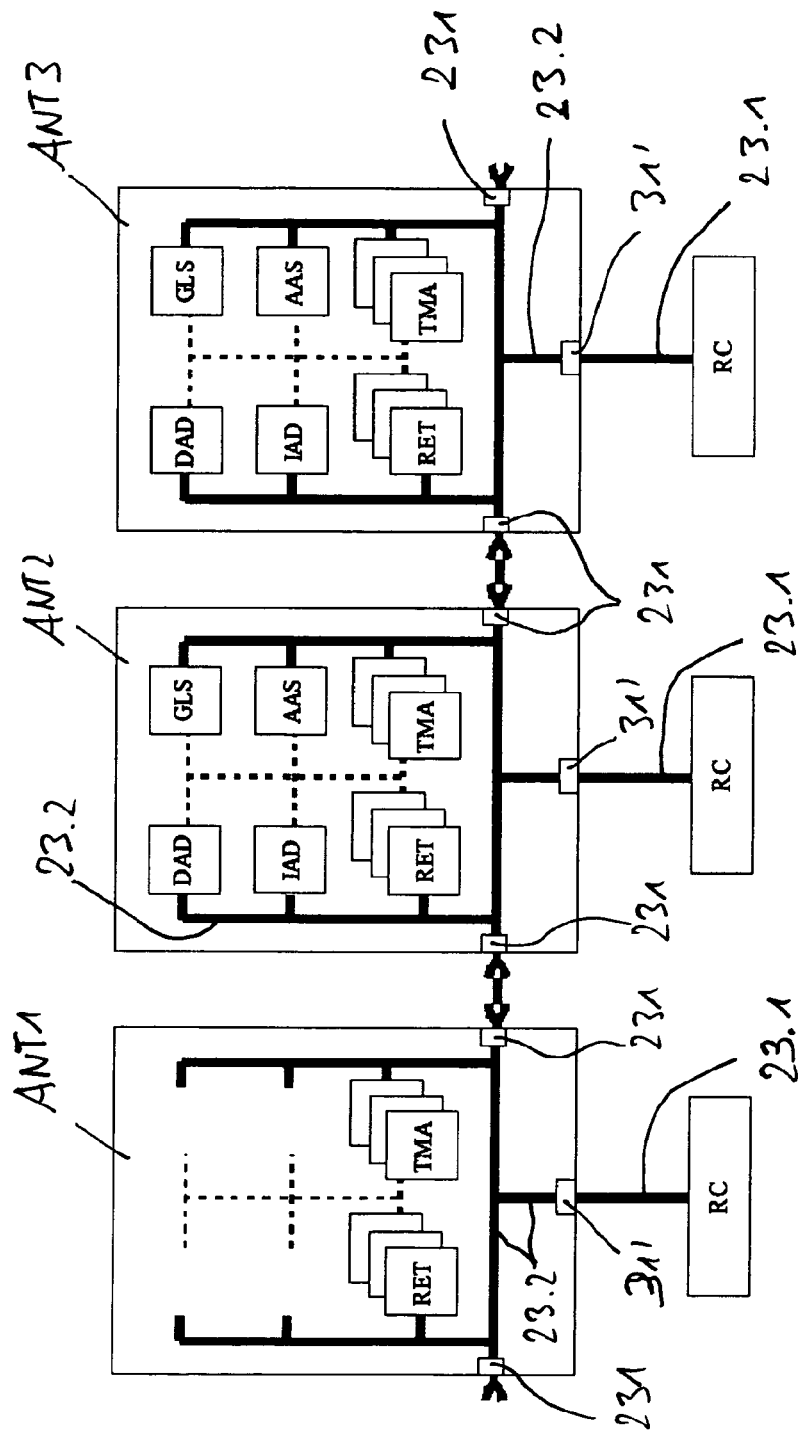
Figure 9:
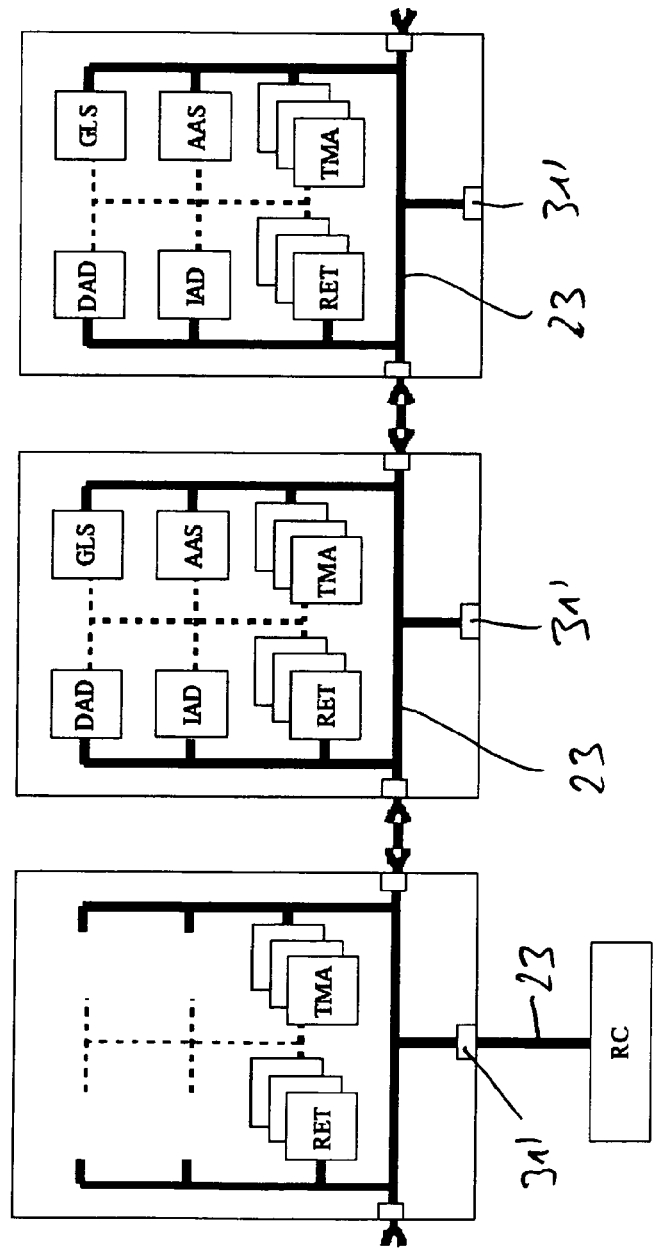

FIG. 8 shows a further embodiment according to the invention, in which a plurality of antenna devices can be connected together via their external communications bus; and FIG. 9 shows a further embodiment according to the invention which is based on FIG. 8 and in which the further connected antenna devices only communicate with one remote-controllable unit via the common external communications bus and are controlled thereby.

Figure 1:
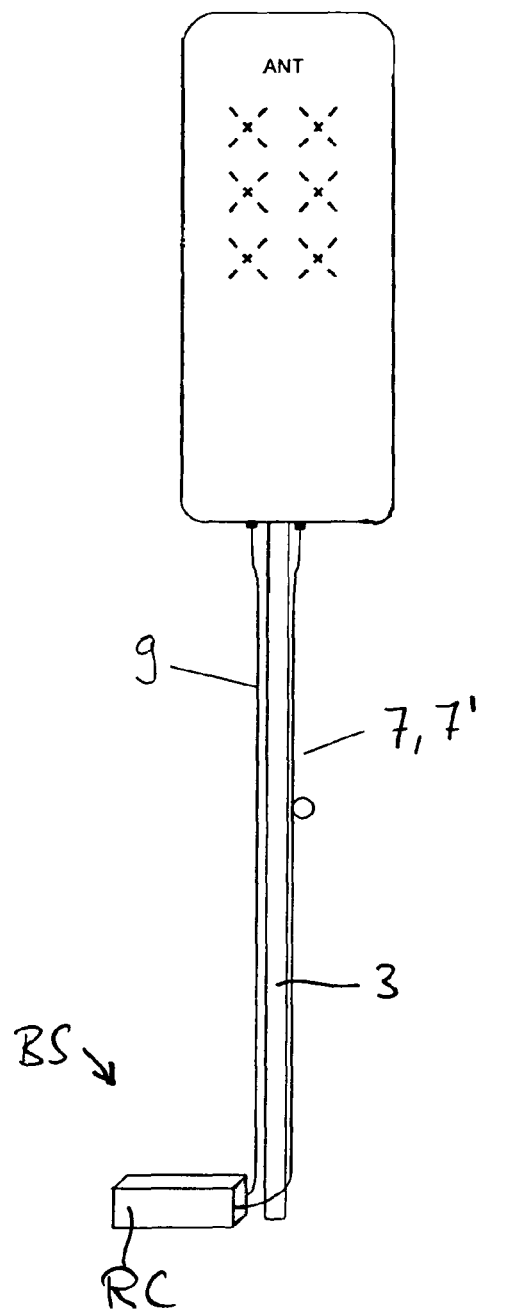
FIG. 1 is a schematic view of a mobile radio antenna system with a base station.

FIG. 1 shows an arrangement of a mobile radio station. The associated mobile radio base station BS comprises a remote controller RC which, in the following, will sometimes also be called remote control unit RC. This remote controller handles essentially all baseband functions of a base station. FIG. 1 also schematically shows an antenna mast 3 and an antenna device ANT mounted in the upper region of the antenna mast 3, for example with one or more antenna arrays.

In the illustrated embodiment, two lines, namely a main line 7 which preferably consists of a fibre optic cable 7', run between the remote control unit RC and the antenna device ANT. The transmitted signals and received signals as well as the control signals for the functional units accommodated in the antenna unit, i.e. in the antenna device ANT (or for functional units connected there) are generally transmitted by this main line 7. The payload and control data are thus transmitted by the main line 7. In addition thereto, between the remote control unit RC and the antenna device ANT a further line 9 runs, by which, for example a direct current supply is possible for the components and functional units provided in or on the antenna device ANT. Instead of a fibre optic cable, a separate feeder cable can naturally also be generally provided for each polarisation, by which separate feeder cable the corresponding communication runs between the remote control unit RC and the antenna device ANT and by which a DC component can be transmitted and can be coupled and decoupled, for example by a bias tee circuit.

Figure 2:
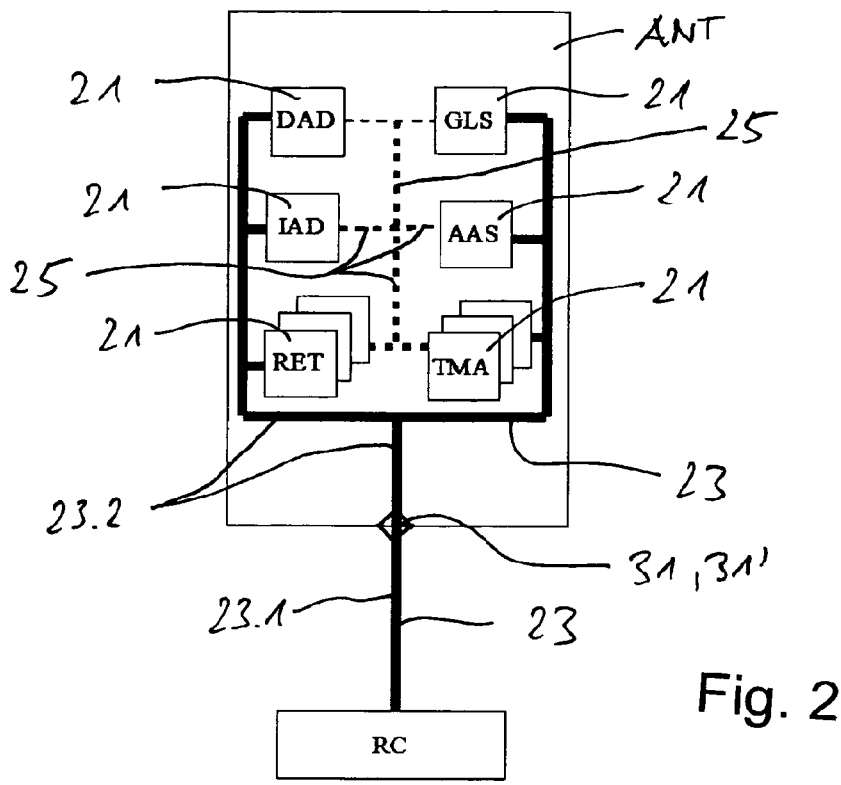
FIG. 2 is a schematic view of an antenna device according to the invention with a specific communications structure between a remote-controllable unit and the functional units which are provided integrated in the antenna device or connected thereto.

FIG. 2 is a schematic detail view of an antenna system, shown generally in FIG. 1, which in the following will sometimes also be called an antenna device, with an external communications bus 23 (communications channel) to produce a connection between the external remote control unit RC and the functional units 21 on the one hand as well as a further internal communications bus 25 (signalling channel) on the other hand for signalling and for the exchange of data between the functional units.

In this arrangement, ANT again denotes the antenna device in general with a large number of emitter elements or emitter devices 19 which preferably emit in two polarisation planes which stand vertically relative to one another. They can preferably be oriented at an angle of +45° or −45° with respect to the horizontal or vertical, as is known for antenna devices according to the prior art. In the view according to FIG. 2, the above-mentioned emitter elements or emitter devices 19 are not further indicated. In FIG. 1, these emitters can be inferred in dashed lines in a schematic form and they emit or receive in the two mutually vertical polarisations. In this respect, this is often also denoted as an X polarisation. In the embodiment according to FIG. 2, as in the following embodiments, these emitter devices 19 in the denoted antenna device ANT, which is also denoted in the following as antenna device ANT, are not further indicated.

This antenna device comprises, in addition to the emitter devices 19, a large number of antenna functional units 21 which are integrated into the antenna or are connected close to the antenna and are connected via the mentioned communications bus 23 (communications channel 23) to the antenna-remote base station controller which is usually accommodated in the so-called base station and which, as mentioned, is also called an external remote control unit RC (remote controller).

In other words, it can be inferred from the illustrated embodiment according to FIG. 2 that the communications bus 23 is divided into a first and second external communications bus 23.1, the first external communications bus 23.1 extending over the transmission path between the remote control unit RC and the antenna device ANT, and merging for example at a transition 31 at the antenna device ANT into the further external communications bus 23.2 which is provided inside the antenna device ANT and there leads to the functional units 21 accommodated integrated into the antenna device or connected there. In other words, the external communications bus 23.1 on the side of the base station can merge directly into the external communications bus 23.2 on the side of the antenna, and an interface 31' can also be configured at this transition 31 or a modem can be provided, for example.

In the illustrated embodiment, six internal functional units 21 are provided, namely:
DAD: an inclination device (Declination Antenna Device)
RET: a remote-controllable control unit for adjusting the lowering angle of the antenna (down-tilt angle)
GLS: a geographical location sensor to detect the geostationary positions of the antenna (Geographical Location Sensor)
AAS: a functional unit for the azimuth alignment of the antenna (Antenna Alignment Sensor)
TMA: an antenna amplifier mounted on the antenna-side (Tower Mounted Amplifier)
IAD: a functional unit for the synchronisation and mutual exchange of data of the functional units between one another.

In other words, a plurality of different functions is preferably provided for the antenna, usually separate functional units 21 or combinations of functional units. As mentioned, depending on the configuration of the antenna, these functional units are accommodated, partly or fully integrated, in the antenna device ANT or they can be connected close to the antenna. This provides the advantage that similar demands made on the functional units in respect of communication, data management and range of functions are combined.

As known per se, the communications protocol between the external remote control unit and the functional units close to the antenna can be based on the AISG standard consortium and/or 3GPP for the control of the connected antenna devices (Antenna Line Products ALD). According to these standards, communication is divided into three layers, namely Layer 1, Layer 2 and Layer 7. These layers are defined as follows:

a) layer 1: represents the physical link layer. This is defined on the one hand for a serial bus based on the interface standard RS485 and on the other hand for transmission via the feeder cable using the "on-off keying" modulation method. The connection behaviour and power consumption in respect of power supply for the respective case of use is defined for both transmission methods.

b) Layer 2: represents the data link layer. Based on the HDLC specification, the communications class UNC1,15,1 TWA (Two-Way Alternative) is used. A definition is provided as to which UNC commands are used, how the address allocation required for communication takes place and how the HDLC parameters of window size and information field length are established. A master, usually the base station controller, initiates the communication, addresses the respective slave and said slave generates the respective response frame to the master. This can be a layer 2 or a layer 7 communication.

c) Layer 7: represents the commands for the respective functional unit. The commands are divided into general commands valid for all functional units, the common procedure set, and into specific commands associated with the respective application or functional unit.

After the power supply has been switched on (power on), the base station controller (remote control unit RC) determines which functional units are located at the common bus 23 and a communications address is allocated to each functional unit 21. This procedure is relatively complex because each functional unit 21 must be able to be clearly identified via a bus scan process, and only then can the actual addressing procedure take place. This communication takes place on layer 2 by means of XID frames.

After the addressing procedure, the functional unit is put into the connected state by the layer 2 frame SNRM (Set Normal Response Mode) and layer 7 commands and responses can then be transmitted.

If a command is transmitted to layer 7, the I frame (Instruction Frame) is used for this purpose as the instruction sequence. It is either possible for the functional unit to immediately respond with an I frame or, depending on the function, it is possible that a certain amount of time is required for processing and preparing the layer 7 response.

The remote controller RC queries all functional units in a polling loop on layer 2 by means of the command or enquiry RR frame (Receiver Ready). The functional units can either similarly indicate their reception readiness with an RR frame or they can deliver the response on a layer 7 command with a queuing I frame. The response of the polling frames indicates to the base station controller the communication readiness or retrieves responses queuing thus which can also be generated independently of the functional unit, in the case of alarm signalling.

A number of items of information which are exchanged on layer 7 by the "common procedure set" are available in redundant manner in the individual functional units. This arises from the fact that each functional unit 21 can be realised independently. In the event of integration into an antenna, care must be taken in respect of an inconsistency of this redundant data, because this data can be retrieved and modified in several ways.

It can be seen from the illustration according to FIG. 2 that all the functional units 21 are connected with equal access on the mentioned antenna-side external communications bus 23.2, i.e. on the antenna-side portion of the entire external communications bus 23, so that each functional unit 21 can receive all the commands and the external remote control unit RC can communicate directly with each functional unit 21. In this respect, each functional module 21 can assume an active role and can carry out the communication with the remote control unit.

Although in principle each functional unit 21 can be used for synchronisation and mutual data exchange, in the embodiment according to FIG. 2 the additional unit IAD is preferably provided for this purpose.

In the illustrated embodiment, the task of the basic layer 2 communication is allocated to this functional unit IAD. On the other hand, the application-based layer 7 communication is assumed by each functional unit 21 itself. In other words, in the case of a layer 7 communication, the entire communication is handled by the respective functional unit itself, including the layer 2 communication (layer 2 frames). The individual functional units 21 can synchronise activities and changes in status, exchange information of redundant data etc. via the internal signalling channel 25, also provided in FIG. 2, via which all the functional units 21 are connected.

With regard to the functional structure according to FIG. 2, a variant is shown in which it is possible to see a connection of the external communications bus (communications channel) 23 to the individual, equal-access functional units 21. Each functional unit 21 can receive the command from the external remote control unit RC and can assume an active role in order to carry out the layer 7 communication with the remote control unit RC.

For synchronisation and for the mutual exchange of data, the internal functional units 21 are connected together via a multi-master communications bus (signalling bus) 25, i.e. by an internal communications bus 25.

The functionality of the general layer 2 communication with the RC can be allocated to a functional unit. In this example, this function is allocated to the IAD. The IAD assumes the processing of layer 2 commands as well as the preparation of layer 2 responses.

The synchronisation and coordination of competence for command preparation layer 2 or layer 7 between IAD and one of the other functional units can i) on the one hand take place via the internal communications bus 25 (i.e. the internal communications channel 25 which in the following will sometimes also be called signalling bus or signalling channel 25), and ii) on the other hand, this is also possible via a time allocation of the response preparation for IAD and functional unit. With this type of time synchronisation, the layer 2 response is only prepared by the IAD after a defined time interval, provided that the layer 7 response has not been handled by a functional unit in the previous time interval.

Synchronisation is necessary in the case of a layer 2 polling of the RC in respect of present layer 7 commands of the functional units.

Figure 3:
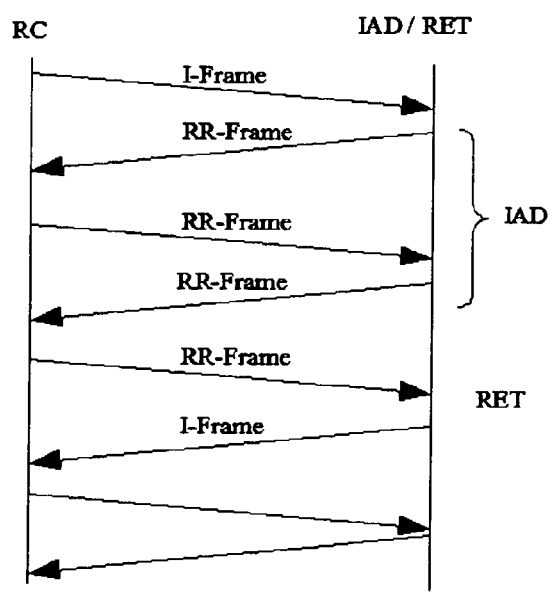
FIG. 3 is a schematic view of a typical communications sequence between a remote-controllable unit and two functional units.

FIG. 3 shows a typical communications sequence between the remote control unit RC on the one hand and a functional unit 21, for example in the form of the functional unit RET or the functional unit IAD.

FIG. 3 shows the division of the layer 2 communication and layer 7 communication, that is, in the time sequence downwards from above.

The communication is usually initiated by the remote control unit RC with an I frame, i.e. a so-called instruction frame (instruction signal) on level "layer 7". The functional unit 21, here the functional unit RET or IAD is addressed via the base address and subaddress. The RET functional unit 21 processes the command and, in this case, the processing exceeds the response time frame.

In this case, the functional unit IAD handles the layer 2 response provided for this case. As soon as the RET functional unit 21 has finished the processing and has prepared the layer 7 response, the remote control unit RC takes over the layer 7 response from the RET functional unit 21 with the next RR frame (i.e. a signal that the receiver is ready—Receiver Ready).

In the embodiment according to FIG. 2, reference numeral 31 further denotes the transition from the external communications bus 23.1, provided on the transition path between the remote control unit RC and the antenna device ANT, to the antenna-side external communications bus 23.2. In the illustrated embodiment, the two aforementioned external communications buses 23.1 and 23.2 are directly interconnected, i.e. they merge into one another.

Deviating from this, however, it is also possible for there to be provided at the transition 31 an interface 31', for example in the form of the RS-485 interface standards which is suitable for digital line-bound, differential or serial data transmission. However, it is also possible to use a modem, etc. Other modifications are also conceivable here.

In the following, reference will be made to the embodiment according to FIG. 4 which shows a different example of the realisation of the internal signalling channel 25.

Figure 4:
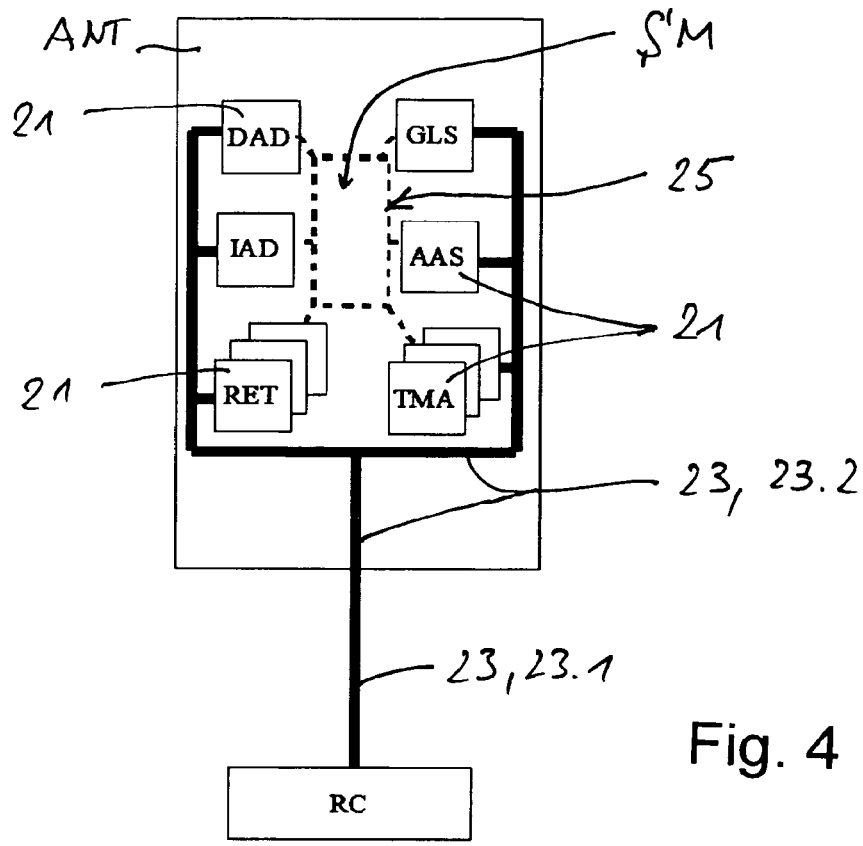
FIG. 4 shows an embodiment according to the invention, differing from FIG. 2, of an antenna device with a shared memory region.

FIG. 4 shows a shared memory SM for the synchronisation and mutual exchange of data of the functional units between one another. Redundant common data can also be stored in this shared memory SM and retrieved via one of the functional units. Thus, in other words, the internal communications bus, i.e. the so-called signalling bus is formed in this case by the shared memory SM, i.e. by the memory device SM, which the plurality of functional units are entitled to access.

The mentioned shared memory SM or a region thereof can also be used to store redundant data which is allocated to individual functional units 21. This reduces the entire storage requirement and contributes overall to an increase in efficiency.

In the following, reference will be made to the embodiment according to FIG. 5.

Figure 5:
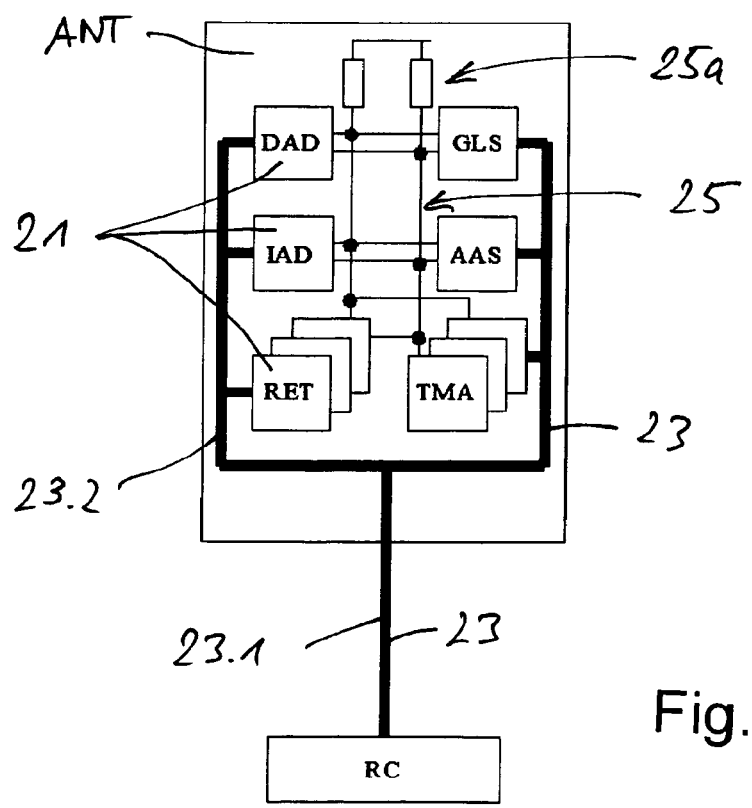
FIG. 5 is a further modified embodiment of an antenna device according to the invention with ports which are connected together according to a wired-or connection and can also be closed or opened to thereby perform a synchronisation between the functional units.

FIG. 5 shows the circuitry of open collector ports 25a of the functional units 21 for the synchronisation and mutual exchange of information of the functional units between one another. A respective open collector line can be allocated to the individual functional states. The open collector circuitry produces per line a wired OR connection (wired-or) which can be used in any respect, for example for all the functional units to have registered the allocation of the base address.

Figure 6:
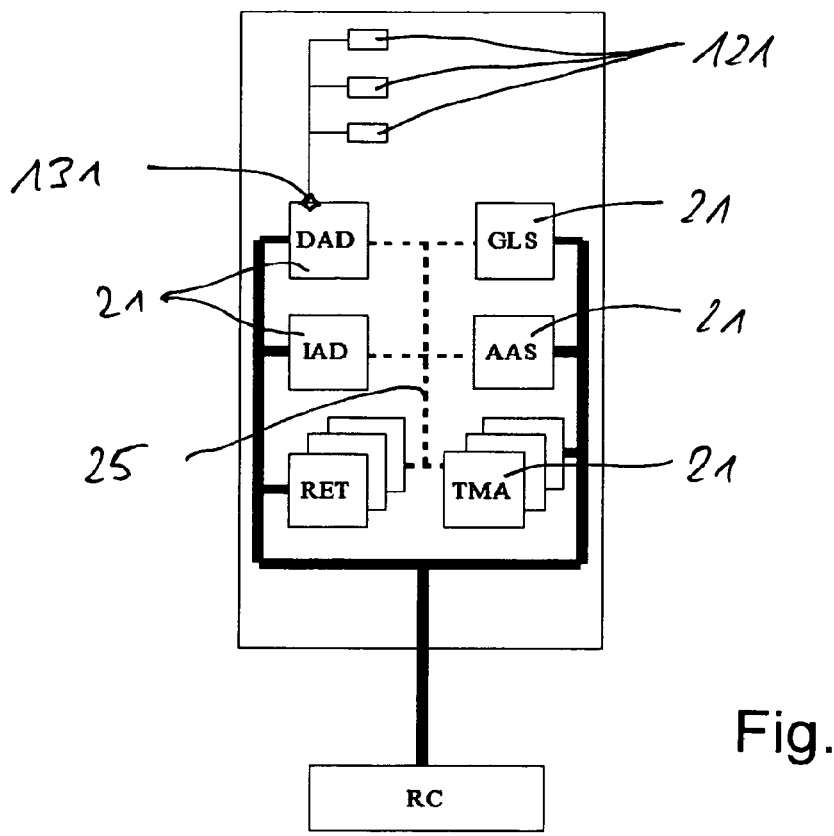
FIG. 6 shows a further modified embodiment with additionally provided sub-functional units which can communicate with a functional unit via an interface.

In the following, reference will be made to the embodiment according to FIG. 6 which shows that the antenna device ANT also has subordinate functional units, so-called sub-functional units 121. These sub-functional units 121 are allocated, for example to a specific functional unit 21. The functional unit 21 concerned can control the sub-functional units 121, for example via an interface 131 associated with this functional unit and can communicate with the sub-functional units 121. Additional sub-functional units 121 of this type can also be allocated to other functional units 121 and can be actuated by separate interfaces.

Figure 7:
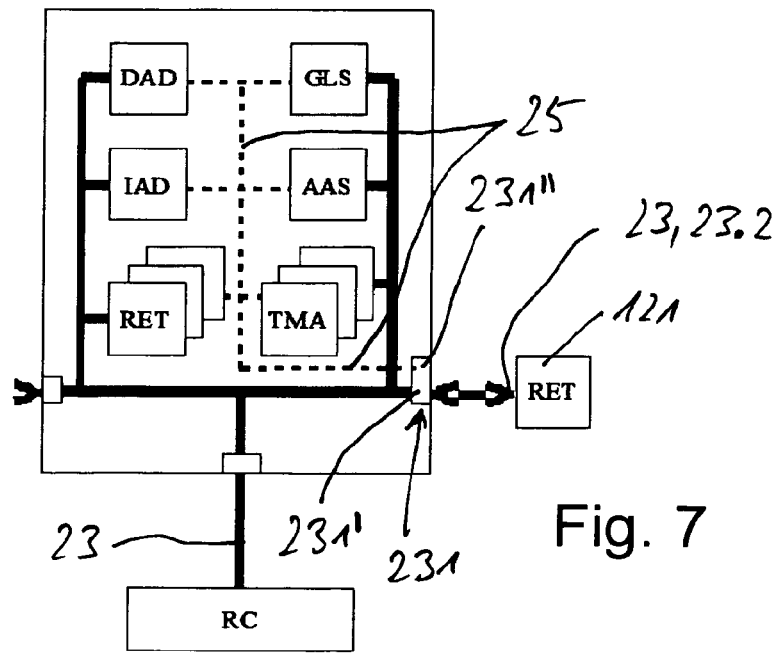
FIG. 7 shows a further embodiment with an externally connectable functional unit.

FIG. 7 shows an antenna device with a plurality of functional units and a connected external functional unit 121. The external functional unit 121 is similarly connected to the external communications bus 23, 23.2 and to the internal communications bus or synchronisation channel 25. The corresponding interface devices 231 with an interface 231' for the communications bus 23, 23.2 and an interface 231" for the signalling or internal synchronisation channel 25, i.e. the communications bus 25 are shown in FIG. 7.

In the embodiment according to FIG. 7, only a single external functional unit 121 is shown, for example the functional unit RET, as has already been described with reference to FIG. 2. However, other functional units or a plurality of such functional units can also be connected externally.

Finally, reference will be made to a further modified variant according to FIG. 8 which shows an antenna system with series-connected individual antenna devices.

The three antenna devices ANT1, ANT2 and ANT3 according to the embodiment of FIG. 8 are constructed alike, identically or similarly, have a respective communications bus structure 23.1 which is accommodated integrated in the antenna device ANT1, ANT2 or ANT3 and is part of the so-called "external communications bus 23", as well as the associated internal functional units 21, as have already been described with reference to the preceding embodiments.

Furthermore, these antenna systems have a respective interface, i.e. an external interface device 231, by which the individual internal communications bus structures 23 of the antenna systems are connected together or can be connected together, i.e. can be linked together as desired. Accordingly, further antenna systems can also be connected so that, in other words, a plurality of antenna systems is connected in series in respect of their so-called external communications bus 23. However, a connection does not necessarily have to be in series for a corresponding bus structure. Branching bus structures are also possible and admissible.

Finally, FIG. 9 shows that all the antenna systems also comprise an interface device 31', by which the respective external communications bus 23.1 on the side of the transmission path and the antenna-side external communications bus 23.2 are connected together or can also be separated from one another. In principle, the antenna system concerned is connected to the external remote control unit RC by the respective mentioned interface 31'.

The antenna-side external communications bus 23.2 can be guided out at one or more additional ports (interfaces 231), so that the connection of a plurality of antenna devices ANT or the switching on of one or more external individual functional units 121 is possible (similarly to what is shown in FIG. 7).

During this switching on procedure, antennae or functional units connected to this port can be mutually identified and address regions or an offset for the internal subaddresses can be specified. This allows communication with similar antenna systems over the same communications channel while retaining the optimised addressing.

The communications channel for the respective external remote control unit is deactivated during this period or a "busy" or "not ready" signal is given because the corresponding connection between the associated remote control unit RC and the associated antenna device ANT is at least temporarily interrupted.

The additional functional units 21 (which have been added by the connected antenna devices ANT2, ANT3 etc.) bound into the common external communications bus structure 23 by connecting together additional functional systems ANT2, ANT3 etc. to produce an existing antenna system AN1 can be communicated, for example, to the first remote control unit RC which belongs to the first antenna device ANT1, as an additional functional unit, that is, with those subaddress regions. This provides the possibility that functional units which are only present once can be used by a plurality of external remote control units. Provided for this is a disconnection and a connection of the external functional units as well as of the external remote-controllable interfaces 31' and 231.

The entire construction can be such that when a plurality of antenna systems are interconnected after a defined and/or predeterminable time (i.e. after the power-on), the communications bus 23 to the remote control unit is disconnected with respect to further connected antenna systems and the detection of the connected further antenna systems is carried out, for example only via one remaining communications bus structure 23 to an actively remaining remote control unit RC.

In this respect, after the detection of the external antenna systems, an offset can also be delivered for the subaddress region with respect to the provided functional units 21 integrated into the other connected antenna systems, so that the external functional units 21 of the connected antenna devices ANT2, ANT3 can also be managed via a primary antenna system with an associated remote control unit RC, as shown in FIG. 9.

The external communications bus can be activated and deactivated depending on the addressed subaddress. The necessary address for the communication between the remote control unit RC can consist of a base address and an internal subaddress, whereby the base address is firmly allocated by pre-allocation and/or can be set by hardware, for example by DIP switches. The above-mentioned offset for the internal subaddresses for the functional units of the connected antenna devices ANT2, ANT3 can also be firmly predetermined by pre-allocation, for example.

FIGS. 8 and 9 show that the plurality of antenna devices ANT1 to ANT3 are directly interconnected via a real communications bus 23. To some extent or as a matter of principle, the one or more additional antenna devices ANT2 and ANT3 can also be connected together, for example with the first antenna device ANT1 via a radio connection, so that the external communications bus is also realised to some extent via a radio link.

The invention claimed is:

1. Antenna system comprising:
    at least one emitter device,
    a plurality of functional units connected in the at least one emitter device, the functional units being configured for monitoring, measuring and controlling parameters of an antenna device, each of said functions being realized by a separate one of the plurality of functional units or by a combination of the functional units,
    the functional units being interconnected via a common external bidirectional communication bus providing equal, direct access by a remote control unit to each of said functional units,
    said external communication bus being connected directly or via an interface to the external remote control unit,
    each functional unit being connected to the remote control unit via the bidirectional external communication bus,
    the common external communication bus being configured to carry out the configuration, control and/or querying of one or more of the functional units,
    the functional units being configured in such a way that in each case one of the functional units addressed by polling handles the communication with the remote control unit, and
    an internal communication bus also provided for the at least one emitter device, configured to exchange information and/or action states between the functional units connected in the at least one emitter device.

2. Antenna system according to claim 1, wherein a required address for communication between the remote control unit and the functional units consists of a base address and of an internal subaddress, and
    the antenna system is configured in such a way that an allocation of the base address by the remote control unit is effective for a plurality of or for all the functional units by a single addressing procedure.

3. Antenna system according to claim 2, wherein the functional units are configured in such a way that a task of accepting an address and a task of confirming the address is allocated to any desired functional unit.

4. Antenna system according to claim 2, wherein the functional units are constructed in such a way that the allocation of the base address by each functional unit is automatically monitored by the other functional units and is acknowledged by the internal communication bus.

5. Antenna system according to claim 2, wherein the functional units are configured in such a way that the information of the base address is communicated via the internal communication bus to other functional units.

6. Antenna system according to claim 1, wherein the antenna system is configured in such a way that a sub, partial or secondary address region is moved via an offset to another address region.

7. Antenna system according to claim 1, wherein the antenna device is constructed in such a way that a functional unit which handles a communication with the remote control unit signals the communication processing to the other functional units via the internal communication bus.

8. Antenna system according to claim 1, wherein the internal communication bus comprises a shared memory storage region and connections to the individual functional units.

9. Antenna system according to claim 1, wherein the internal communication bus comprises 1 to N wired "OR" lines and a function is allocated to each line, with N representing a whole natural number.

10. Antenna system according to claim 1, wherein the internal communication bus comprises an internal multi-master communication bus which is not visible from outside the plurality of functional units and is separate from the external communication bus.

11. Antenna system according to claim 1, wherein the external communication bus is guided out of the antenna device and is linked in the form of a pin-and-socket connector with a further antenna device and/or an external functional unit via an interface.

12. Antenna system according to claim 1, wherein
    the external communication bus is divided into a transmission-path-side external communication bus coming from the remote control unit and an antenna-side external communication bus, and
    the antenna system further comprises a switchable interface for connecting or detaching the transmission-path-side external communication bus to or from the antenna-side external communication bus.

13. Antenna system according to claim 1, wherein a plurality of antenna devices and the external communication bus devices thereof, are connected via a radio link.

14. Antenna system according to claim 11, wherein the antenna system is configured in such a way that, in a defined and/or predetermined time period after the connection of the power supply and/or the activation of the antenna device, one or some of the antenna devices, which are interconnected in respect of their external communication bus, is/are disconnected from the associated remote control device and a detection procedure for ascertaining further disconnected antenna devices is carried out.

15. Antenna device according to claim 14, wherein the antenna system is configured in such a way that after the detection of a further external antenna device, an offset for the subaddress region in respect of the functional units provided in the further antenna devices is transmitted from a first antenna device to a further antenna device and these functional units which are provided in the further antenna devices are managed via the remote control unit connected to the first antenna device.

16. Antenna system according to claim 15, wherein the external communication bus is switched on and off depending on the addressed subaddress for the connected functional units of the connected antenna devices.

17. Antenna system according to claim 1, wherein the required address for the communication between the remote control unit and the functional units consists of a base address and of an internal subaddress, and the base address is permanently allocated by pre-allocation.

18. Antenna system according to claim 1, wherein the address for the communication between the remote control unit and the functional units consists of a base address and of an internal subaddress, and DIP switches are configured to set the base address.

19. Antenna system according to claim 2, wherein an offset o the internal subaddresses is permanently allocated by pre-allocation.

20. Antenna system according to claim 2, wherein an offset for the internal subaddresses is be set by hardware, by DIP switches.

21. Antenna system according to claim 8, wherein redundant data allocated to individual functional units is also stored in the shared memory storage region.

22. Antenna system according to claim 1, wherein functional units which are provided in the antenna device and are not present in another antenna device can also be used by the antenna device or by the external remote control units.

23. Antenna system of claim 1 wherein the external bus and the internal bus are separated and isolated from each other and not linked together.

* * * * *